J. D. JEWELL.
UNDERPAN FOR AUTOMOBILES.
APPLICATION FILED MAR. 29, 1915.

1,182,378.

Patented May 9, 1916.

Witnesses
Alice Walker
Laura Hackmann

Inventor
John D. Jewell
by
Oliver Harman
Attorney

UNITED STATES PATENT OFFICE.

JOHN D. JEWELL, OF CINCINNATI, OHIO.

UNDERPAN FOR AUTOMOBILES.

1,182,378. Specification of Letters Patent. Patented May 9, 1916.

Application filed March 29, 1915. Serial No. 17,795.

*To all whom it may concern:*

Be it known that I, JOHN D. JEWELL, a citizen of the United States, and a resident of Cincinnati, in the county of Hamilton and State of Ohio, have invented certain new and useful Improvements in Underpans for Automobiles, of which the following is a full, clear, and exact description thereof.

My invention relates to under pans, dust or grease pans, or guards for use in connection with automobile chassis.

It is the object of my invention to provide a pan for automobile chassis which assumes a position under the engine of the automobile, and which is provided with a removable center section provided with means for preventing rattling, and one which is simple in construction, efficient in its use, and inexpensive to manufacture.

Pans such as are now in use at the present time are so constructed that it is a difficult matter to remove same when it is desired to gain access to the bottom of the engine, and it is also a difficult matter to reach tools or any other article which have inadvertently dropped down under the engine into the pan.

It is the object of this invention to overcome these disadvantages by providing a pan with a section which can be easily removed whenever desired, without the necessity of unbolting the whole pan from the chassis, and without removing bolts and screws.

Figure 1:
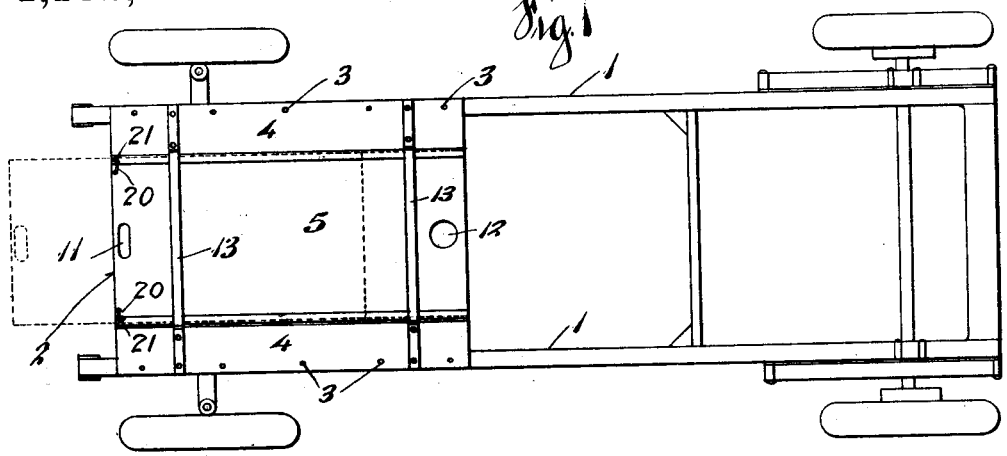
Figure 2:
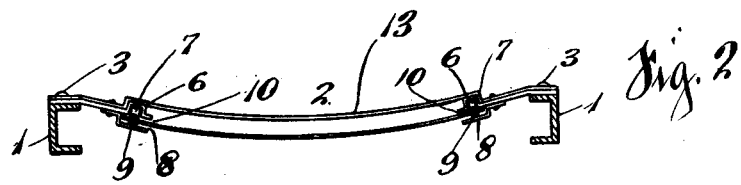
Figure 3:
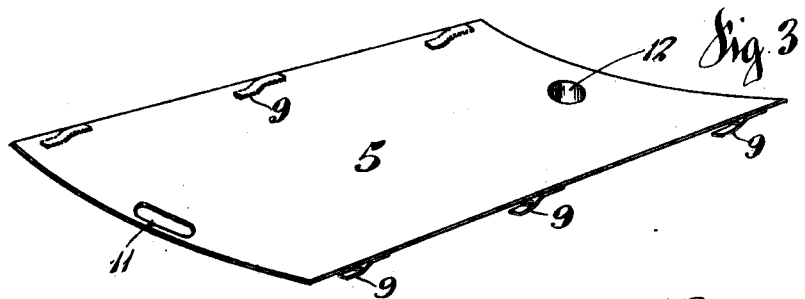
Figure 4:
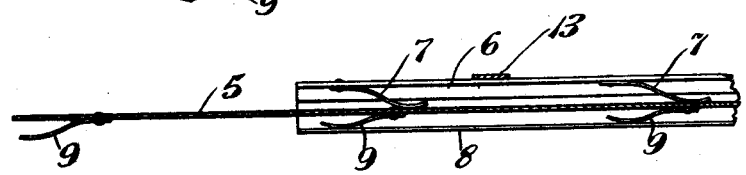

In the accompanying sheet of drawings which serves to illustrate my invention, and which shows a preferred construction Figure 1 is a plan view of a portion of an automobile chassis equipped with my invention. Fig. 2 is a cross-section of the same. Fig. 3 is a view of the removable section of the pan. Fig. 4 is a detail sectional view of the spring construction to prevent the rattling of the pan.

Referring more particularly to the drawings, 1 represents an automobile chassis, and 2 my improved pan bolted thereto by means of bolts 3. The pan 2 is constructed preferably of three sections, two side sections 4 which are bolted to the chassis and a removable section 5 therebetween. The side sections 4 are preferably constructed with a groove 6 at their upper sides, in which buffer springs or other suitable cushion device 7 is mounted, said cushion device adapted to bear against the removable section 5. The side sections are also provided with a lower lip or flange 8 disposed opposite the groove 6 and underneath same. Buffer springs 9 are mounted on each side of the removable section 5 and are adapted to bear against the said lower lip or flange 8 and prevent the removable section proper from engaging with said lip. Thus, the removable section when inserted in the channel 10 which is provided by means of the lower lip 8 being mounted on the side sections, the removable section 5 is not allowed to engage the side sections, but engages the springs or cushion members 7, and thereby eliminates the liability of rattling.

I provide an aperture 11 at the front end of the removable section which constitutes a handle portion for the removable section 5. I also provide a well 12 at the other end of said removable section which is adapted to catch all of the waste oil and grease, so that the same may be easily removed and emptied in a convenient place without allowing same to drop from the pan on to the floor of the garage.

It will be noted that the springs 9 on the lower side of the removable sections are the ordinary leaf springs, and their free ends preferably point toward the front of the automobile, so that the pan can be inserted easily. The other leaf springs 6 which are fastened in the side sections preferably have their free ends facing toward the rear of the machine for the same purpose.

In order to prevent the spreading apart of the side sections, and thereby loosening the removable section 5, I provide brace bars 13 which are preferably fastened to the side sections 4 and extend across the top of the pan, thereby bracing the two side sections together.

Locking means consisting of hooks 20, is provided, the hooks adapted to engage eyes 21, suitably mounted as shown, so as to prevent the removable section from being removed or becoming loosened by a constant jarring. When it is desired to remove the removable section, it is simply necessary to unfasten these hooks 20.

While I have shown a particular construction for preventing the removable section from rattling, other devices will readily present themselves which will answer the purpose, and I, therefore, do not wish to be confined to the exact details shown except as pointed out in the claims.

What I claim as new and desire to secure by Letters Patent is:

1. In an automobile and in combination with a chassis, of a pan mounted thereon, a removable section in the central part of said pan and a resilient bearing for said removable section.

2. In an automobile and in combination with a chassis, of a pan mounted thereon, said pan having three sections, the central section being removable, and cushion means for said removable section for preventing rattling.

3. In an automobile and in combination with a chassis, of a pan mounted thereon, said pan having a removable section at the central portion thereof, a handle portion at the front end of said removable section, and cushion means for said removable section for preventing rattling.

4. In an automobile and in combination with a chassis, of a pan mounted thereon, a removable section at the central part of said pan and adapted to slide longitudinally, a handle portion at the front end of said removable section, and means for preventing the rattling of said removable section.

5. In an automobile and in combination with a chassis of a pan comprising two side sections being fastened to said chassis, a middle section adapted to slide longitudinally in said side sections, resilient bearing members between said removable section and said side sections for preventing rattling, and means for locking the removable section.

6. In an automobile and in combination with a chassis, of a pan comprising three sec-parallel sections, the middle section being slidable in the side sections, a well at the end of said removable section, a handle portion at the front end of said removable section, and cushion members between said removable section and said side sections.

7. In an automobile and in combination with a chassis, of a pan comprising three sections, one of said sections being slidable with relation to the others, bracing members for strengthening said pan, and cushion members bearing against said slidable section.

8. In an automobile and in combination with a chassis, of a pan mounted thereon, tions, one of said sections being slidable with relation to the others, bracing members for strengthening said pan, cushion members bearing against said slidable section, a well at one end of said slidable section and a handle at the other end, substantially as and for the purposes set forth.

9. In an automobile and in combination with a chassis, of a pan mounted thereon, said pan comprising side sections fastened to said chassis, and a middle section slidable in said side sections, said side sections being provided with grooves in which said middle section slides, cushion members in said grooves and braces for connecting the said side sections together forming braces for the pan.

10. An under pan comprising a series of sections, one of said sections being slidable with a relation to the others, bracing members for strengthening said pan, cushion members bearing against said slidable section and means for locking said slidable section against sliding movement.

11. In an under pan, a slidable section, cushion members bearing against said slidable section to prevent same from rattling, and locking means on said slidable section for holding said section against sliding movement.

JOHN D. JEWELL.

Witnesses:
OLIVER W. SHARMAN,
ALICE WALKER.

Copies of this patent may be obtained for five cents each, by addressing the "Commissioner of Patents, Washington, D. C."